United States Patent [19]

Kirkwood

[11] 3,817,268

[45] June 18, 1974

[54] SPHERE LAUNCHING VALVE

[76] Inventor: Creal E. Kirkwood, 3237 N. Lewis, Tulsa, Okla. 74110

[22] Filed: June 12, 1973

[21] Appl. No.: 369,190

[52] U.S. Cl............................ 137/268, 15/104.06 A
[51] Int. Cl. ........................................... F16k 25/00
[58] Field of Search ............ 137/268; 251/175, 172; 15/104.06 A; 73/3

[56] References Cited
UNITED STATES PATENTS

| | | | |
|---|---|---|---|
| 3,220,432 | 11/1965 | Allen .................................. | 137/268 |
| 3,224,247 | 12/1965 | Barrett, Jr. ....................... | 137/268 X |
| 3,580,539 | 5/1971 | Van Scoy......................... | 137/268 X |
| 3,658,093 | 4/1972 | Kirkwood ....................... | 137/625.43 |

Primary Examiner—Henry T. Klinksiek
Assistant Examiner—Robert J. Miller
Attorney, Agent, or Firm—Head & Johnson

[57] ABSTRACT

This disclosure describes an improved type of sphere launching valve for use in meter prover systems. It comprises a horizontal axis cylindrical shell with opposed openings at top and bottom for the entry and exit of a sphere. There is a rotor axially supported in bearings with means to rotate the rotor at least through an angle of 180°. A sealing means is provided on the rotor so that an expansible tubular sealing element can be inflated by fluid pressure so as to seal between the rotor and the internal sealing surface of the housing or shell. In the preferred embodiment there are two parallel sealing means, these run in an axial direction and a circumferential direction so that they completely seal one of the two openings to the housing from the other. The rotor is shaped as a cup so that when the top of the cup is facing upward a sphere can be loaded into the cup shaped interior of the rotor. At a later time the rotor can be turned 180° and the open top of the cup will point downward so that the sphere can fall through the bottom opening of the housing, down through the pipe, and into the circulating system and the meter prover loop.

Inside the cup there is a hinged platform which is held up by a spring, but under the weight of the sphere, when the sphere is loaded into the rotor, the platform will move down to a bottom position. Means are provided, including a rod means passing through one axis of the rotor, and including a magnetic element extending beyond the housing so that the position of the platform whether lifted or depressed, will be indicated by the position of the magnet and therefore an external indication is provided of the presence of a ball inside the rotor.

9 Claims, 4 Drawing Figures

PATENTED JUN 18 1974 3,817,268
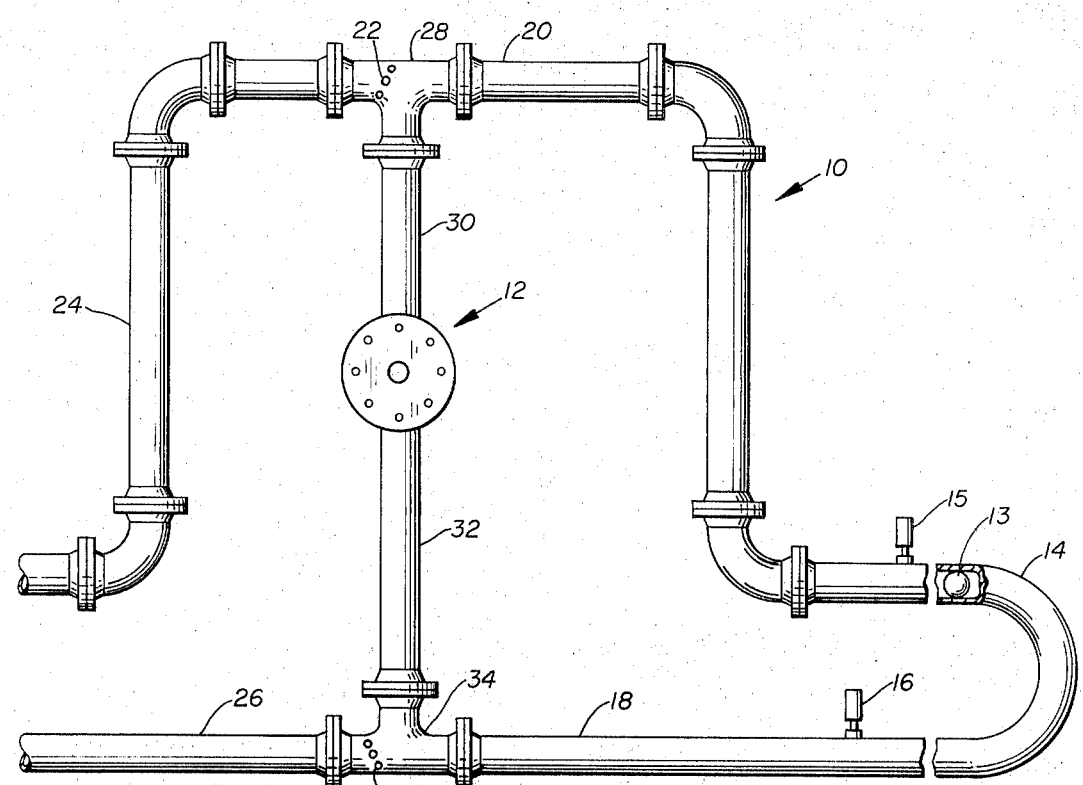
FIG. 1
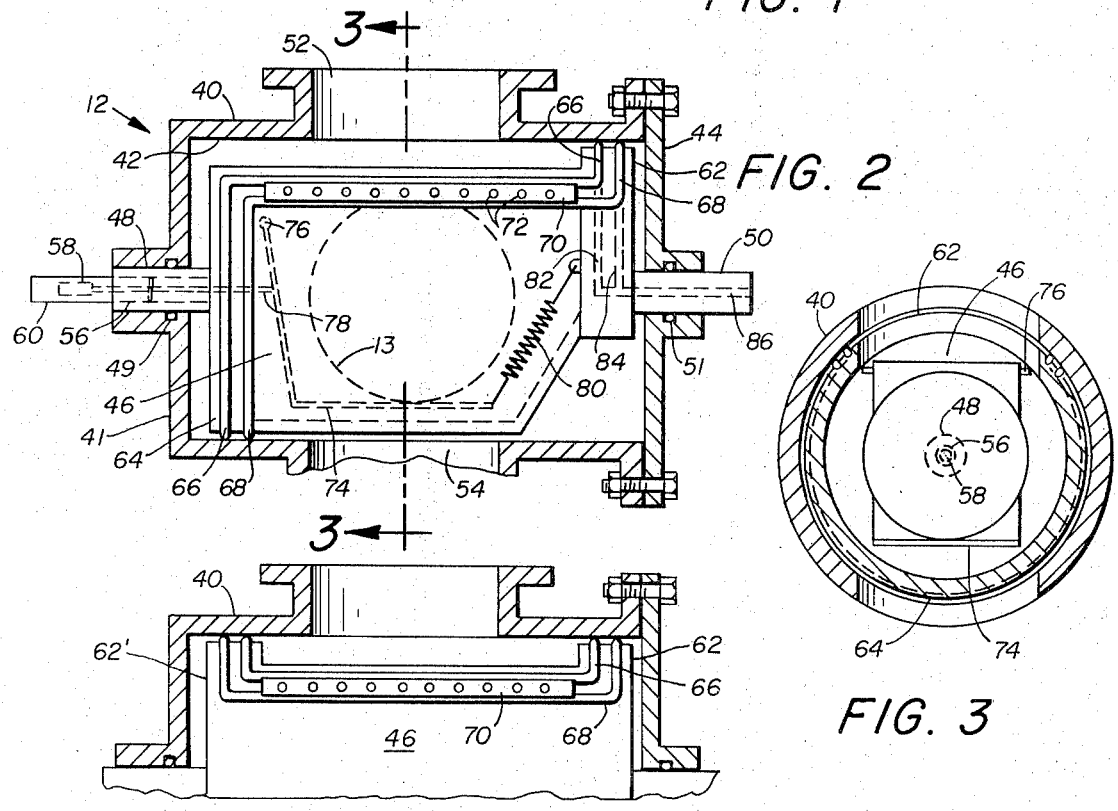
FIG. 2
FIG. 3
FIG. 4

3,817,268

SPHERE LAUNCHING VALVE

BACKGROUND OF THE INVENTION

This invention lies in the field of meter prover systems. More particularly it is concerned with the design of a transfer valve which can be used to insert a sphere into the prover loop, while maintaining a complete fluid seal between the input and the output terminals of the loop.

Still more particularly it includes a type of sealing means which includes two parallel tubular expandable complaint tubes, which can be inflated to be expanded and pressed across the space between the rotor and the sealing surface of the housing of the valve.

Still more particularly it is concerned with providing means to display externally of the transfer valve an indication of the presence inside of the valve of a sphere ready to be loaded into the line.

In the prior art there are many examples of means for loading spheres into a meter prover loop, however, many of these are complicated and expensive systems and require the presence of two or more sealing spheres in the system to provide a pressure seal between the input and the output lines of the prover loop.

SUMMARY OF THE INVENTION

It is a primary object of this invention to provide a rotatable valve device inserted in a return line from the output of a meter prover loop to the input line, whereby a circulating sphere can be caught inside the rotor of the valve, so that when the valve is turned 180° about a horizontal axis the ball will fall out of the rotor and downward into the inlet line of the meter prover loop.

This and other objects are realized and the limitations of the prior art are overcome in this invention by having a sphere loading valve installed with its axis horizontal in a vertical pipe joining the return line from the meter prover loop to the input line of the meter prover loop. This valve comprises a cylindrical shape housing, or case, with a rotor axially mounted in bearings in the end walls of the housing. The housing itself is provided with an inlet opening at the top and an outlet opening at the bottom. Inside the housing is a rotor which is in the form of a cup. The rotor has a horizontal axis which is perpendicular to the axis of the cup. The open end of the cup can be facing upwardly and positioned below the inlet opening to the housing. When a ball is dropped into the rotor and the rotor is rotated 180° about its horizontal axis, the cup opening will now be facing downwardly and the ball will drop out of the cup and fall through the vertical pipe to the inlet of the prover loop. Expansible tubular sealing means are provided in the outer surface of the rotor so as to provide a continuous seal against the internal surface of the shell or housing so that when the tubular sealing means is inflated there will be a continuous seal between the top opening and the bottom opening so that there will be no transfer of liquids through the valve.

Inside the cup is a hinged platform which is lifted by means of a spring. When the ball drops into the cup and onto the platform, the weight of the ball will cause the platform to drop to a lower position. An indication of this position will be carried by means of an axial rod, through the bearing of the rotor to an external tube. A magnet attached to the rod will be positioned outwardly when the platform is lowered, and more inwardly when the platform is raised. The position of the magnet will be an indication of the position of the platform, and therefore indication of the presence of a ball, or sphere, inside of the rotor.

BRIEF DESCRIPTION OF THE DRAWINGS

These and other objects of this invention and a better understanding of the principles and details of the invention will be evident from the following description taken in conjunction with the appended drawings, in which:

FIG. 1 indicates generally the construction of a meter prover system and the use of the sphere transfer valve in such a system.

FIG. 2 indicates in transverse cross section further details of the transfer valve of this invention.

FIG. 3 is a cross-sectional view of the transfer valve taken along the line 3—3 of FIG. 2.

FIG. 4 indicates a variation of FIG. 2 with a different arrangement of the sealing means.

DESCRIPTION OF THE PREFERRED EMBODIMENT

Referring now to the drawings and in particular to FIG. 1, there is shown in schematic form one arrangement of a meter prover system in which the piping system is indicated generally by the numeral 10 and the sphere transfer valve is indicated by the numeral 12. There is a meter prover loop pipe 14 through which the fluid entering the system passes. This loop has two indicators 15 and 16, such as are well known in the art. The movement of the sphere 13 past the indicators generates electrical signals, by means of which the time of travel of the sphere through the loop 14 can be precisely timed. Knowing the internal volume of the loop 14 the volume of liquid transfer by the movement of the sphere from indicator 16 to indicator 15 is a true measure of a fluid transferred.

In FIG. 1, incoming liquid flows in through pipe 26 through the tee 34, through pipe 18 past the indicator 16 into the prover loop 14, past the indicator 15 and out through pipe 20, tee 28 and pipe 24. There is a screen 22 in the outlet and a screen 36 on the inlet so that the sphere 13 as it passes through pipe 20 and enters the tee 28 will be stopped by the screen 22 and fall down through the pipe 30 into the valve 12. Later, when the valve is turned to release the sphere, it will fall down through pipe 32 and will move in the direction of pipe 18 because of the flow of liquid coming in through pipe 26.

This general arrangement of piping and prover loop and indicator areas is well known in the art. The novelty of this invention lies in the valve 12 which will now be described in connection with FIGS. 2, 3 and 4.

The sphere transfer or sphere launching valve 12 comprises a cylindrical casing 40 with two end walls 41 and 44. The internal cylindrical surface 42 is smooth and polished and serves as a sealing surface so that the rotor 46 as it turns, can provide a complete seal around its exterior surface so that there will be a closure between the top or inlet opening 52 and the bottom or outlet opening 54 of the housing. The rotor 46 has two axles 48 and 50 which are sealed in bearings in the end walls by means of O-rings 49 and 51. The axle 50 extends beyond the cover plate 44 of the housing and means are provided, well known in the art, for rotating the rotor by grasping the axle 50 and turning it.

The rotor comprises a cup shaped container with an upper open top, in a position shown in FIG. 2, and closed off on the bottom. Thus a sphere dropping down through the opening 52 will fall into the cup and be retained therein. When the rotor is turned 180° the ball will fall out of the cup through the opening 54 and down through the pipe 32.

It is important in meter prover systems that the bypass portion, comprising pipes 30 and 32, must be completely sealed so that there will be no transfer of fluid from pipe 26 to pipe 24 except through the prover loop 14. This sealing is provided by having inflatable compliant tubings 66 and 68, fastened to the external surface of the rotor, so that they can be inflated by fluid pressure to make a sealing contact to the inner surface 42 of the housing.

This invention is related to a patent, U.S. Pat. No. 3,658,093, entitled "Valve Having Expandable Sealing Means." The inventor of U.S. Pat. No. 3,658,093 is the same as the inventor of this application, and the U.S. Pat. No. 3,658,093, is made part of this application by reference.

In the U.S. Pat. No. 3,658,093, complete details are shown of the design and construction of the tubular sealing means which are positioned on the surface of the rotor and serve to provide a barrier between the inlet and outlet of the housing. Briefly the sealing means comprises grooves in the surface of the rotor into which expandable tubing has been inserted. Fluid pressure inside the tubing will expand and extend it outwardly, to provide a positive sealing pressure against the internal wall of the housing.

As shown in the U.S. Pat. No. 3,658,093, there are two circular portions of the rotor and two axial portions which are sealed. In the axial portions the tubes are held in position by strips 70 applied to the rotor by means of such as screws 72. On the circular portion the tubes are placed in grooves and are held into the grooves by their own length. One circular portion 62 is shown facing upwardly, and the other circular portion 64 is shown facing downwardly so that by tracing out the sealing tubes there will be a complete circuit, and pressure seal dividing the two openings in the housing. The use of two parallel tubes, as indicated in the U.S. Pat. No. 3,658,093, provide additional capability of determining the character of the seal. No further details of the fluid connection to the tubes 66 and 68 are needed. These are brought out by the bored openings 82 and 84 with an axial opening 86 to which fluid pressure means is attached. This is fully described in the U.S. Pat. No. 3,658,093 and need not be described further at this time.

As shown in FIGS. 2 and 3 there is a hinged platform 74 which is hinged about horizontal axis 76 inside the rotor. There is a cylindrical rod 78 attached to the platform and which passes through a drilled opening 56 in the axis 48 of the rotor. There is a nonmagnetic tubular extension 60 of this opening 56, to seal the fluid pressure inside the valve. Inside the extension 60 is a bar magnet 58 which is attached to the rod 78. A spring 80 is positioned so as to lift the platform. In doing this it will withdraw the rod 78 and move the magnet 58 closer into the valve. When the sphere drops down through the opening 52 and lands on the platform, its weight will overcome the pull of the spring 80 and cause the platform 74 to move downwardly to its lowest position. This will cause the rod 78 to move out. The magnet will therefore move outwardly to its outermost position. The position of the magnet can be detected by conventional means. Therefore, there is positive indication available, exterior to the valve, of the presence of a sphere 13 inside of the rotor of the valve.

In FIG. 4 is shown in schematic form the fact that the circular portions of the sealing means 66 and 68 can both be in the same direction, and contact the inner wall over the same cylindrical portion. In other words, the cylindrical portion 62 can be matched with a corresponding one 62' at the other end of the rotor, instead of facing in the opposite direction in accordance with portion 64 of FIG. 2. Either arrangement will work equally well to seal the inlet from the outlet of the valve.

In normal conditions the fluid pressure inside of the tubing is quite high so as to maintain a strong and perfect seal. Under these conditions it may not be desirable to rotate the valve until this pressure is relaxed somewhat otherwise the sealing means may be injured by being torn against sharp edges at the openings to the sealing surface. Consequently, it may be desirable to relax the pressure, rotate the valve and increase the pressure again to provide the necessary seal.

While the invention has been described with a certain degree of particularity it is manifest that many changes may be made in the details of construction and the arrangement of components. It is understood that the invention is not to be limited to the specific embodiments set forth herein by way of exemplifying the invention, but the invention is to be limited only by the scope of the attached claim or claims, including the full range of equivalency to which each element or step thereof is entitled.

What is claimed:

1. A sphere launching valve for a pipeline system, for insertion into a vertical pipe in said system, comprising:

a. a cylindrical body having a smooth internal sealing surface with two diametrally opposed openings transverse to the axis of said body;

b. a rotatable support member inside said body with shaft means axially aligned in said body and rotatable in bearings in the end walls of said body, at least a first end of said shaft means sealed through one end wall, and means to rotate said shaft means;

c. inflatable deformable sealing means around said support member adapted to press against said sealing surface, and seal the space between said two opposed openings, and means to inflate said sealing means; and d. cup means attached to said support member facing said openings as said support member is rotated; whereby when said valve is inserted into said vertical pipe with said shaft means horizontal and said cup means facing upwardly, a ball dropped into the top of said pipe will fall into said cup, and when said shaft means is rotated 180° said ball will fall from said cup into the bottom portion of said pipe.

2. The valve as in claim 1 in which said sealing means comprises four parts, two parts on each of two opposite edges of said support member parallel to the axis, and two parts, one on each of two circular portions near opposite ends of said support member.

3. The valve as in claim 2 in which said two circular portions are on the curved surfaces of two circular segments attached to said support member.

4. The valve as in claim 3 in which said segments extend in opposite directions from said support member.

5. The valve as in claim 3 in which said segments extend in the same direction from said support member.

6. The valve as in claim 1 in which said sealing means comprises two parallel spaced apart sealing means.

7. The valve as in claim 1 including hinged platform means in said cup, spring means to lift said platform and means external to said valve to indicate the position of said platform.

8. The valve as in claim 7 in which said means to indicate comprises a longitudinal drilled hole in said first end of said shaft means, rod means slidable in said hole and longitudinally responsive to the position of said platform and means responsive to the position of said rod means.

9. The valve as in claim 8 in which said means responsive to said rod means comprises magnetic means.

* * * * *